(12) United States Patent
Fujiwara

(10) Patent No.: US 6,301,710 B1
(45) Date of Patent: Oct. 9, 2001

(54) SYSTEM AND METHOD FOR CREATING A SUBSTITUTE REGISTRY WHEN AUTOMATICALLY INSTALLING AN UPDATE PROGRAM

(75) Inventor: Nobuyuki Fujiwara, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/226,426

(22) Filed: Jan. 6, 1999

(51) Int. Cl.[7] ....................................................... G06F 9/445
(52) U.S. Cl. ................... 717/11; 707/10; 707/203; 709/203; 709/221
(58) Field of Search ................... 717/11; 707/10, 707/200, 203; 709/203, 219, 221, 327

(56) References Cited

U.S. PATENT DOCUMENTS

| | | | |
|---|---|---|---|
| 5,794,052 | * 8/1998 | Harding | 717/11 |
| 5,842,024 | * 11/1998 | Choye et al. | 717/11 |
| 5,857,188 | * 1/1999 | Douglas | 707/9 |
| 5,859,969 | * 1/1999 | Oki et al. | 709/203 |
| 6,088,796 | * 7/2000 | Cianfrocca et al. | 713/152 |
| 6,131,192 | * 10/2000 | Henry | 717/11 |
| 6,189,139 | * 2/2001 | Ladd | 717/4 |
| 6,189,147 | * 2/2001 | Davis | 717/11 |
| 6,195,794 | * 2/2001 | Buxton | 717/11 |

OTHER PUBLICATIONS

Microsoft Technical Support (Support Online), Info: Using The Registry API To Save And Retrieve Settings, Article ID: Q172274, http://support. microsoft.com/support Nov. 25, 1997, pp. 1–6.

Mtomlins, Oracle (Customer Support), WIN/NT/95: Installing ODBC, Document ID: 11143845.61, http://www.oracle.com/support/bulletins/odbc/html/1904.html, Feb. 2, 1996, pp. 1–6.

Oracle (Read File), Radhus.txt, Jul. 17, 1996, pp. 1–4.

* cited by examiner

Primary Examiner—Tuan Q. Dam
(74) Attorney, Agent, or Firm—Gregory J. Koerner; Simon & Koerner LLP

(57) ABSTRACT

A system and method for creating a substitute registry when automatically installing an update program preferably comprises a plurality of computer systems that are connected to a distributed network such as the Internet. Download modules on the computer systems automatically access and download update programs from the distributed network. Install modules then automatically create unique substitute registries that correspond to the downloaded update programs. Finally, the install module loads the update programs onto the computer systems to complete the software installation procedure, in accordance with the present invention.

38 Claims, 11 Drawing Sheets

SYSTEM AND METHOD FOR CREATING A SUBSTITUTE REGISTRY WHEN AUTOMATICALLY INSTALLING AN UPDATE PROGRAM

CROSS-REFERENCE TO RELATED APPLICATIONS

This application relates to co-pending U.S. patent application Ser. No. 09/225,660, entitled "System And Method For Using A Computer Network To Automatically Update Software Programs," filed on Jan. 5, 1999, and also to co-pending U.S. patent application Ser. No. 09/226,704, entitled "System And Method For Using A Substitute Directory To Automatically Install An Update Program," filed on Jan. 7, 1999, which are hereby incorporated by reference.

BACKGROUND OF THE INVENTION

1. Field of the Invention

This invention relates generally to computer software programs and architectures, and relates more particularly to a system and method for creating a substitute registry when automatically installing an update program.

2. Description of the Background Art

Creating an effective method for installing and utilizing computer software programs is a significant concern of many software developers, system administrators and users of contemporary computer systems. Computer software programs typically include a series of instructions that control the operation and functionality of computer systems. In general, computer software continues to evolve in response to factors like improved hardware capabilities and increased functional demands. As computer software evolves, new programs often become available to system users, and already existing computer programs are frequently re-released in updated versions having higher revision levels.

Performing an installation procedure to alter a computer system's current software programs may present a system user or a system administrator with several types of challenges. For example, in user applications that process time-sensitive or highly critical information, successfully and effectively performing a software installation procedure may be a significant event with little or no margin for error. Failure to successfully complete a software installation may cause a costly loss of computing time. Alternately, an ineffective software installation may potentially result in irreversible corruption or destruction of important data, such as business financial records or irreplaceable accounting information.

The increasing prevalence of computer networks creates additional obstacles to successfully and efficiently installing computer software programs. For example, client-server system architectures typically include a significant number of client computer systems that each communicate bi-directionally with a central server system, such as a system database. Attempting to install programs on a large number of individual client systems significantly increases the degree of difficulty for the installation procedure, depending upon the number of individual client systems present in the client-server architecture.

Selecting an effective methodology for installing and utilizing software programs in a computer network environment is also a significant consideration for system users and system administrators. Many system users may lack the requisite programming experience and system knowledge to successfully perform a software installation procedure. Alternately, performing periodic software installations or software updates on a substantial number of client systems may place an onerous burden on system administration resources, and thereby result in an inefficient use of technical personnel.

In addition, performing a software installation procedure may potentially create disadvantageous software conflicts between components of the newly-installed software programs and corresponding components of those software programs that resided on the host computer prior to the installation of the new software. For example, in certain circumstances, installing a newer version of an older, but still necessary, software program may simply overwrite related components of the older software program, and thereby prevent further use of the older software. In other situations, the host computer may also mistakenly identify a newly-installed software program as a previously-installed program due to similar or identical identification characteristics, such as the program name. Such software conflicts present significant obstacles to the effective and efficient performance of a software installation procedure and subsequent utilization of the installed software.

Therefore, for all the foregoing reasons, implementing an effective method for installing and utilizing computer programs remains a significant consideration for software developers, system administrators, and users of computer systems.

SUMMARY OF THE INVENTION

In accordance with the present invention, a system and method for creating a substitute registry when automatically installing an update program is disclosed. In one embodiment of the present invention, a client computer from a client-server system preferably contains several software programs including a client application, server middleware, and a browser program. The client computer preferably communicates with a distributed network, such as the Internet, using the browser program.

In operation, a network access module from the browser program initially accesses a selected network page on the distributed network. The network access module may function in response to a network location address (or uniform resource locator) provided to the client computer by a system user. Alternately, the network access module may automatically access the network page in response to various predetermined access criteria.

A download module on the client computer then preferably performs a comparison procedure between an update program listed on the network page and a software program currently installed on the client computer. The download module determines whether a matching version of the update program currently exists on the client computer.

If a matching version of the update program currently exists on the client computer, then no installation procedure is required, and the installation procedure terminates. However, if a matching version of the update program does not exist on the client computer, then the download module responsively transfers the update program from the distributed network to the client computer. If the update program is in a compressed format, an install module then decompresses the update program to generate an update program in an uncompressed format.

The install module next reads an information file attached to the update program, and responsively updates client computer configuration files to reflect new parameters and requirements corresponding to the update program. In the one embodiment, the install module retrieves registry information from the information file, and advantageously creates a uniquely-named substitute registry in the computer system's software registries to avoid potential software conflicts between the update program and other software programs residing on the client computer system.

The install module then installs the downloaded update program onto the client computer. Finally, a central processing unit in the client computer is notified by the browser program that the installation procedure has been completed, and the central processing unit responsively executes the client application for use by a system user, in accordance with the present invention. The present invention thus efficiently and effectively creates a substitute registry when automatically installing an update program.

DETAILED DESCRIPTION OF THE PREFERRED EMBODIMENT

The present invention relates to an improvement in software utilization techniques. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a system and method for creating a substitute registry when automatically installing an update program, and preferably comprises a plurality of computer systems that are connected to a distributed network such as the Internet. Download modules on the computer systems automatically access and download update programs from the distributed network. Install modules then automatically create unique substitute registries that correspond to the downloaded update programs. Finally, the install module loads the update programs onto the computer systems to complete the software installation procedure, in accordance with the present invention.

Figure 1:
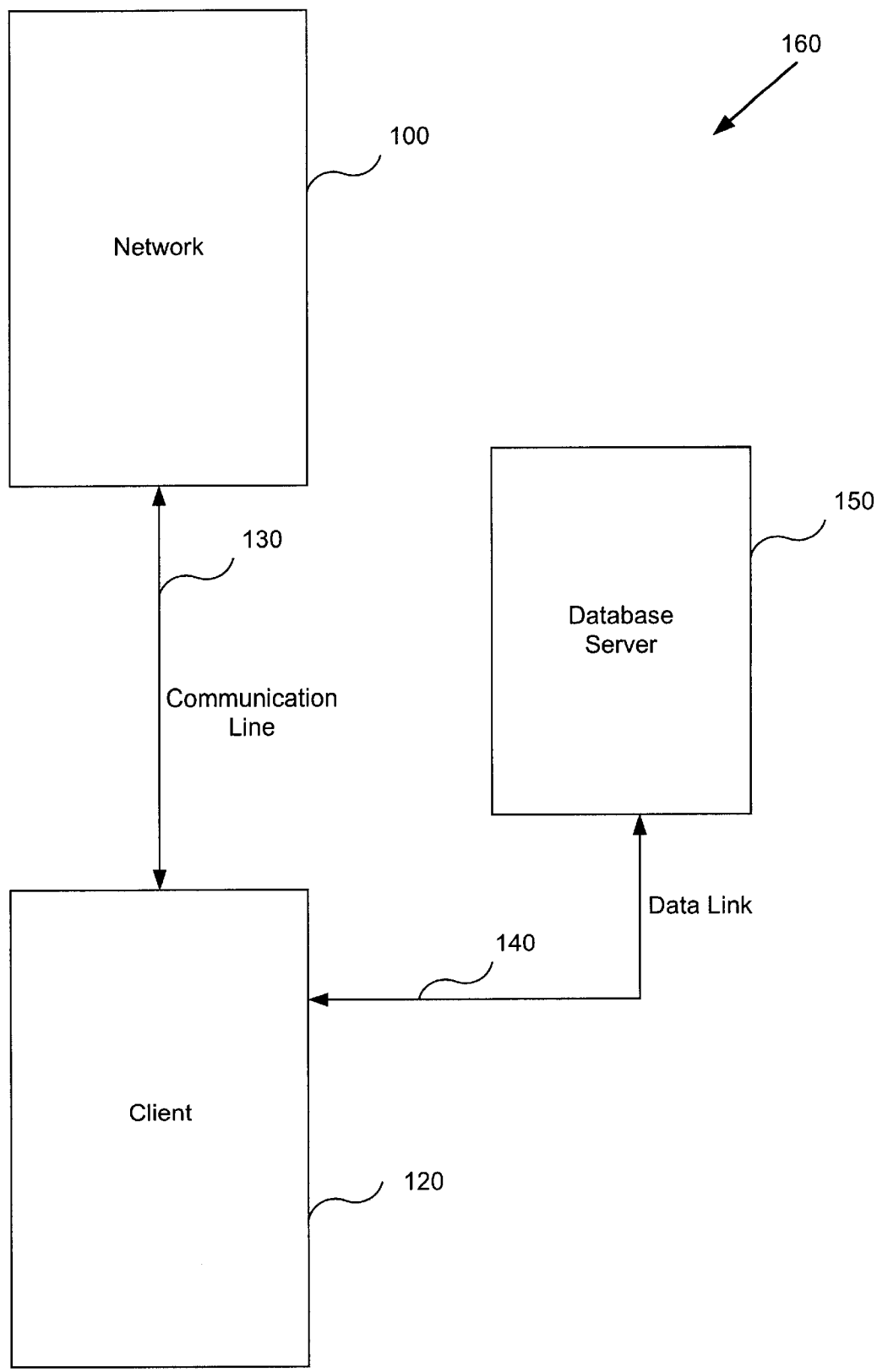
FIG. 1 is a block diagram for one embodiment of a client-server system, in accordance with the present invention.

Referring now to FIG. 1, a block diagram for one embodiment of a client-server system 160 is shown, in accordance with the present invention. The FIG. 1 embodiment of client-server system 160 preferably includes a client 120, a database server 150, and a network 100. For purposes of clarity, a single client 120 is discussed in conjunction with the FIG. 1 embodiment. However, in practice, client-server system 160 may typically include a substantially larger number of additional client systems. Each of the additional client systems is preferably likewise configured to communicate with database server 150 and network 100. Furthermore, in alternate embodiments of the present invention, client-server system 160 may readily include additional database server systems and additional network systems that are in separate communication with each of the foregoing client systems. Alternately, the present invention may also be implemented without database server 150 or network 100.

In basic operation of the FIG. 1 embodiment, client 120 preferably communicates bi-directionally with database server 150 to access and store various types of information. For example, client 120 may access database server 150 via data link 140 to utilize one or more databases for storage and retrieval of certain critical data relating to finance, accounting, sales, or business administration. However, the present invention also includes those configurations in which client 120 alternately communicates with any other compatible type of electronic device. Client 120 is preferably implemented to include a computer system that is further discussed below in conjunction with FIG. 2.

In one embodiment, client 120 and database server 150 each contain verification software that client-server system 160 advantageously utilizes to effectively confirm the successful and accurate transmission of information across data link 140. Client-server system 160 may thus preserve the integrity of all critical data passing between client 120 and database server 150, including detailed financial or business-related information.

In the FIG. 1 embodiment, client 120 may also conduct bi-directional communications with network 100 via communication line 130. In the FIG. 1 embodiment, network 100 may include any appropriate distributed computer network system. For example, network 100 may include economical and non-proprietary distributed computer networks like the Internet system. Such an economical implementation may advantageously provide a low-cost methodology for distributing software programs, in accordance with the present invention. Alternately, network 100 may likewise be implemented to include any proprietary or intranet-type of distributed computer network. Network 100 is further discussed below in conjunction with FIG. 5.

In practice, client 120 typically includes various software programs that periodically may require the performance of a software installation procedure, and subsequent utilization of the installed software. For example, if the revision level of operating software on database server 150 is updated, then corresponding software on client 120 must typically also be updated to remain current with the operating software version on database server 150. The task of installing or updating software on client 120 becomes greatly magnified when a substantial number of client systems are distributed through a large geographic area. The technical limitations of system users of the various client systems may also create a need for an effective method to automatically install software programs on the distributed client systems.

In accordance with one embodiment of the present invention, client system 120 therefore advantageously downloads selected software programs from network 100, and then automatically installs the downloaded software programs to replace outdated versions of existing software programs, or, alternately, to install new software programs that become necessary for use by client 120. In other embodiments of the present invention, a software installation procedure may be automatically performed directly on client 120, without downloading the installation software program from a computer network. For example, a computer system, unconnected to network 100 or database server 150, may readily install new software programs via any appropriate and compatible media, including floppy disk media or compact-disk ROM media, in accordance with the present invention.

Figure 2:
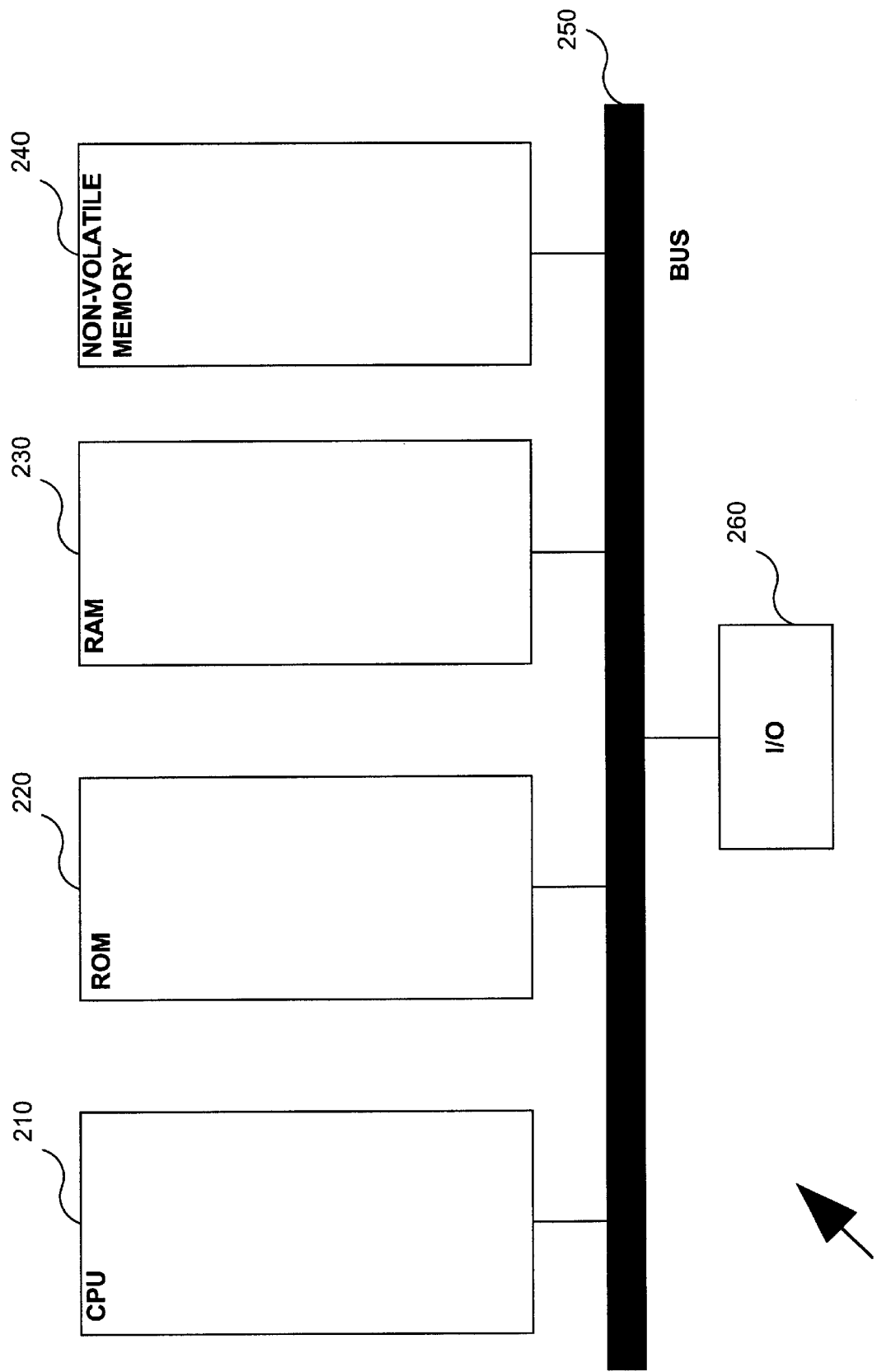
FIG. 2 is a block diagram for one embodiment of the client of FIG. 1, in accordance with the present invention.

Referring now to FIG. 2, a block diagram for one embodiment of the FIG. 1 client 120 is shown, in accordance with the present invention. In the FIG. 2 embodiment, client 120 preferably includes a central processing unit (CPU) 210, a read-only memory (ROM) 220, a random-access memory (RAM) 230, a non-volatile memory 240, and an input/output interface (I/O) 260 that each are coupled to, and communicate through, a common system bus 250. In one embodiment, client 120 may be implemented using a Microsoft Windows® configuration, however other embodiments may readily be implemented using various other compatible configurations.

In the FIG. 2 embodiment, client 120 preferably utilizes input/output interface 260 to communicate with a display monitor (not shown) and a user input device (not shown) such as a keyboard or a mouse. In addition, client 120 preferably utilizes input/output interface 260 to communicate with both database server 150 and network 100. In the FIG. 2 embodiment, non-volatile memory 240 may be implemented as any type of appropriate and compatible non-volatile memory device. For example, non-volatile memory 240 may include a hard disk-drive system or a floppy disk-drive system. The contents and operation of non-volatile memory 240 are further discussed below in conjunction with FIG. 3.

Figure 3:
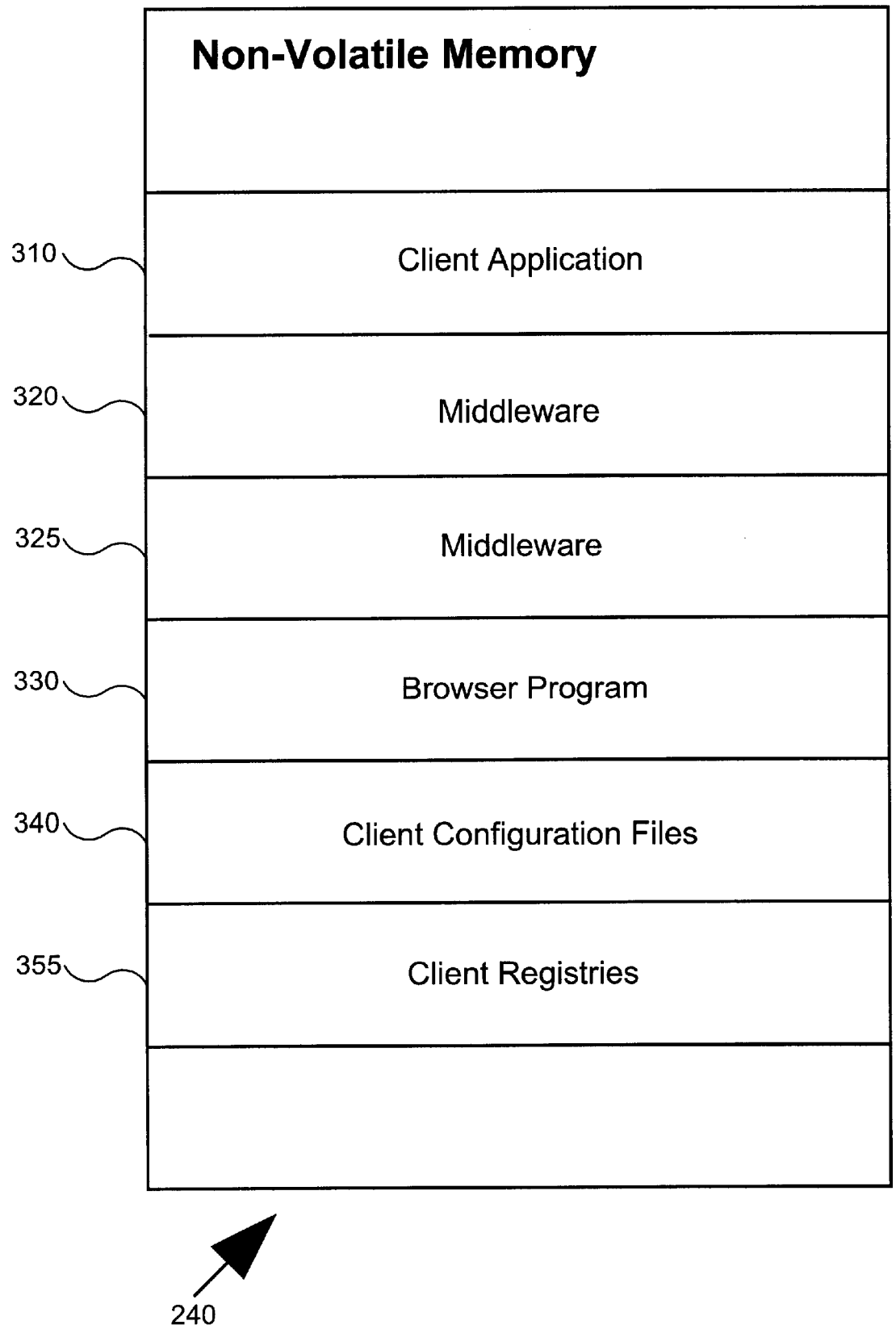
FIG. 3 is a diagram for one embodiment of the non-volatile memory of FIG. 2, in accordance with the present invention.

Referring now to FIG. 3, a diagram for one embodiment of the FIG. 2 non-volatile memory 240 is shown, in accordance with the present invention. In the FIG. 3 embodiment, non-volatile memory 240 preferably includes a client application 310, middleware 320, middleware 325, a browser program 330, client configuration files 340, and client registries 355.

Client application 310 preferably includes software instructions that are executed by CPU 210 to perform a particular computing function for a system user. For example, client application 310 may perform computing tasks such as word processing, accounting, or business management projects. Middleware 320 and middleware 325 each preferably include software instructions that are executed by CPU 210 to allow client application 310 to effectively and efficiently communicate with different databases on database server 150, or on various other server devices. In one embodiment, database server 150 may be implemented to include selected elements similar to Oracle® or Sybase® server systems. Also, middleware 320 and middleware 325 may be implemented to include selected elements of an Open DataBase Connectivity (ODBC) middleware system, in accordance with the present invention. However, in alternate embodiments, database server 150, middleware 320, and middleware 325 may readily be implemented using any appropriate and compatible configurations.

Browser program 330 preferably includes software instructions that are executed by CPU 210 to access and communicate with network 100 (FIG. 1). The contents and functionality of browser program 330 are further discussed below in conjunction with FIG. 4. In one embodiment, browser program 330 may possess selected attributes similar to Internet access programs such as those included in Internet Explorer® or Netscape®, however, in alternate embodiments browser program 330 may readily be implemented to include any other appropriate and compatible configurations. Client configuration files 340 preferably contain various types of information that are related to the functionality and operation of client 120. For example, client configuration files 340 may include information regarding the system directories or system registries for client software and other information currently residing on client 120.

Client registries 355 preferably contain one or more individual registries that each contain relevant information about the various software programs and modules residing on client 120. For example, client registries 355 may include selected information regarding software on client 120, such as the names, version levels, and storage locations of the resident software programs.

In the FIG. 3 embodiment, client registries 355 preferably include a user-editable database that stores configuration data for the various software programs and files on client 120. Each software program may also include sub-registries that correspond to individual components or modules within the various software programs. For example, a financial accounting application program may include individual components like menus, spreadsheets, spellchecking, and filesaving. Client registries 355 may therefore be utilized by a system user in a variety of different situations. For example, when developing a new program that communicates with client application 310, instead of writing specific code to locate client application 310, a system programmer may advantageously reference client registries 355 to determine necessary information like program location and other relevant configuration information related to client application 310.

The structure and configuration details of the individual software programs (and sub-components) included in client registries 355 may thus be advantageously viewed and accessed by a system user by displaying client registries 355 on a graphical user interface (GUI) of client 120. During a software installation procedure, client registries 355 are typically modified to reflect the new updated status of software programs residing on client 120. The structure and functionality of client registries 355 are further discussed below in conjunction with FIGS. 8(a), 8(b), 9, and 10.

Figure 4:
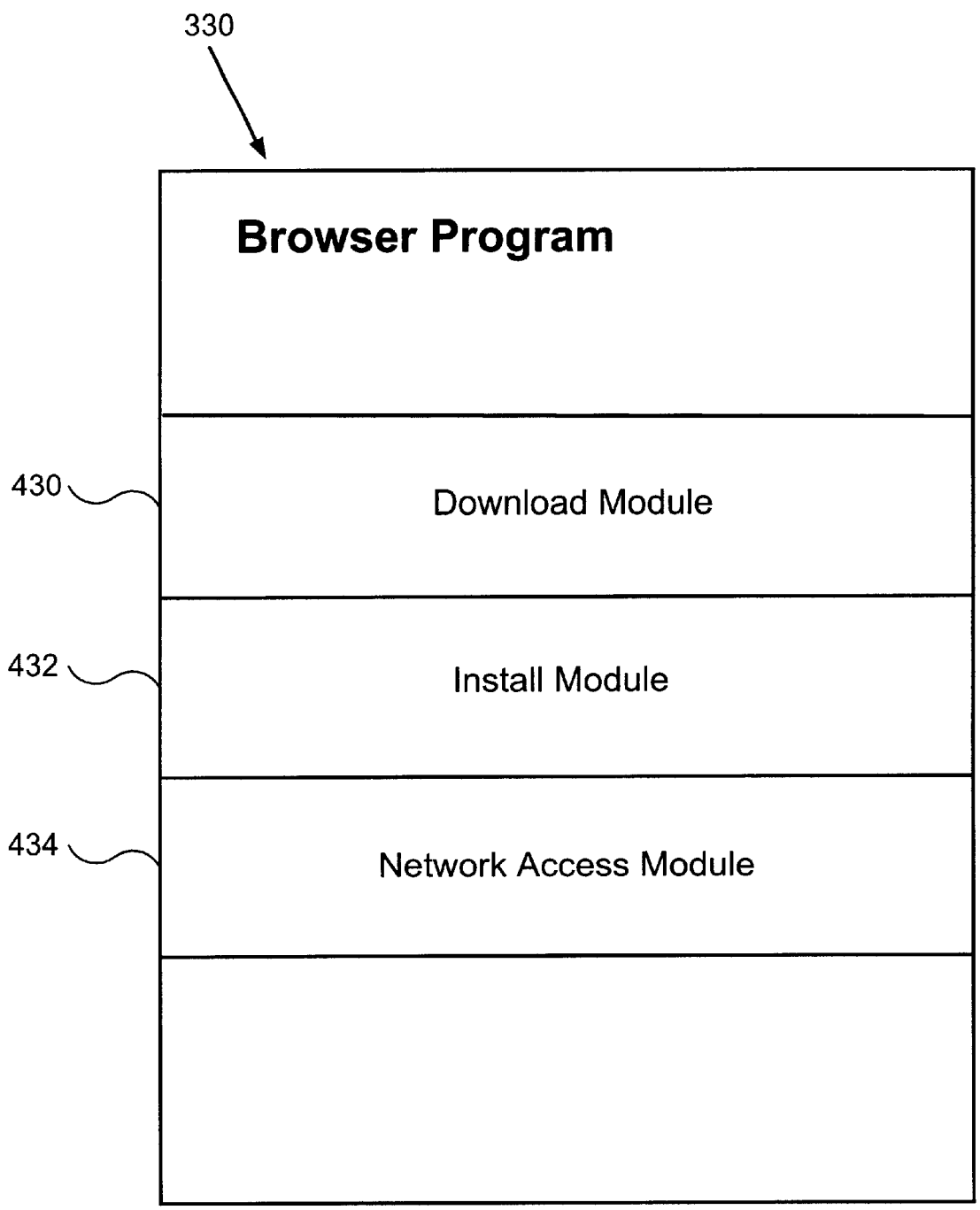
FIG. 4 is diagram for one embodiment of the browser program of FIG. 3, in accordance with the present invention.

Referring now to FIG. 4, a diagram for one embodiment of the FIG. 3 browser program 330 is shown, in accordance with the present invention. In the FIG. 4 embodiment, browser program 330 preferably includes a download module 430, an install module 432, and a network access module 434.

Browser program 330 preferably uses network access module 434 to access and communicate with network 100 (FIG. 1).

Download module 430 preferably includes software instructions that are executed by CPU 210 to identify and download selected update programs from network 100 to client 120. Install module 432 preferably includes software instructions that are executed by CPU 210 to automatically install and configure the update programs downloaded from network 100, or to automatically install and configure software programs from other appropriate sources. In the FIG. 4 embodiment, download module 430 and install module 432 are shown as part of browser program 330. In alternate embodiments, download module 430 and install module 432 may readily be implemented as independent programs that reside outside of browser program 330 in system memory of client 120 or elsewhere in client-server system 160.

Figure 5:
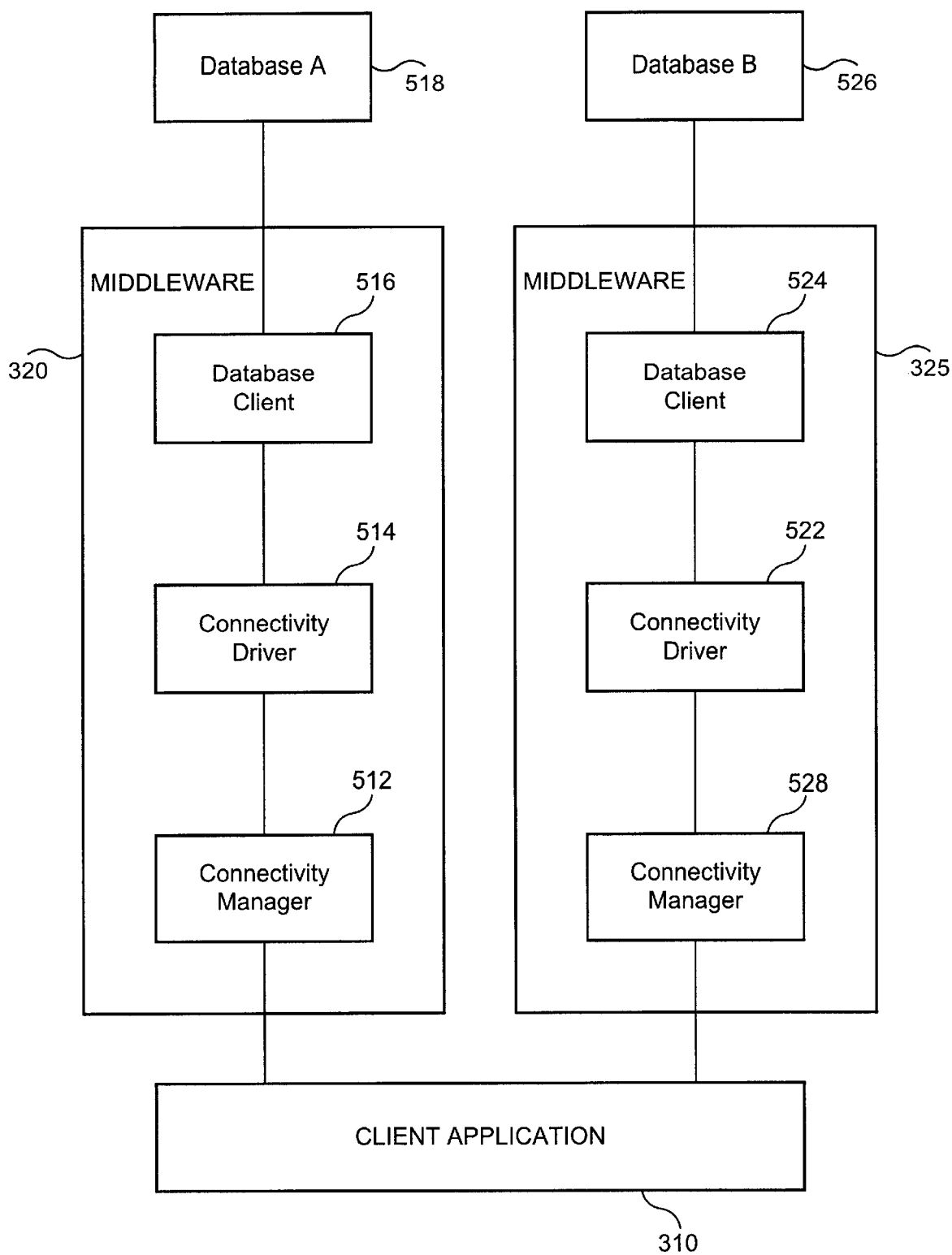
FIG. 5 is a block diagram for one embodiment of two sets of middleware, in accordance with the present invention.

Referring now to FIG. 5, a block diagram for one embodiment of two sets of middleware (320 and 325) is shown, in accordance with the present invention. In the FIG. 5 embodiment, client application 310 preferably communicates bi-directionally with database A 518 through middleware 320 which includes connectivity manager 512, connectivity driver 514, and database client 516. Similarly, client application 310 may also communicate bi-directionally with database B 526 through middleware 325 which preferably includes connectivity manager 528, connectivity driver 522, and database client 524.

In certain cases, the simultaneous presence of both middleware 320 and middleware 325 may create a software conflict in client registries 355 of client 120. For example, if middleware 320 and middleware 325 each have the same program name, then a software conflict may result during the software installation and configuration procedure. Assume that middleware 320 is installed onto client 120 first. When client 120 attempts to install middleware 325 (having the same program name as middleware 320) into client registries 355, then the earlier-installed middleware 320 in client registries 355 may be overwritten, and would thus no longer be accessible by client 120.

The foregoing example of software conflict in client registries 355 is illustrated and discussed in the context of middleware 320 and middleware 325. However, similar software conflicts may readily arise between any related software programs on client 120 or other computer systems. Furthermore, software conflicts may result in configurations other than that presented in FIG. 5, or for reasons other than similarity of program names. For example, software conflicts may potentially result where two or more client applications use different versions of middleware, or different database servers. Software conflicts and client registries 355 are further discussed below in conjunction with FIGS. 8(*a*), 8(*b*), 9, and 10.

Figure 6:
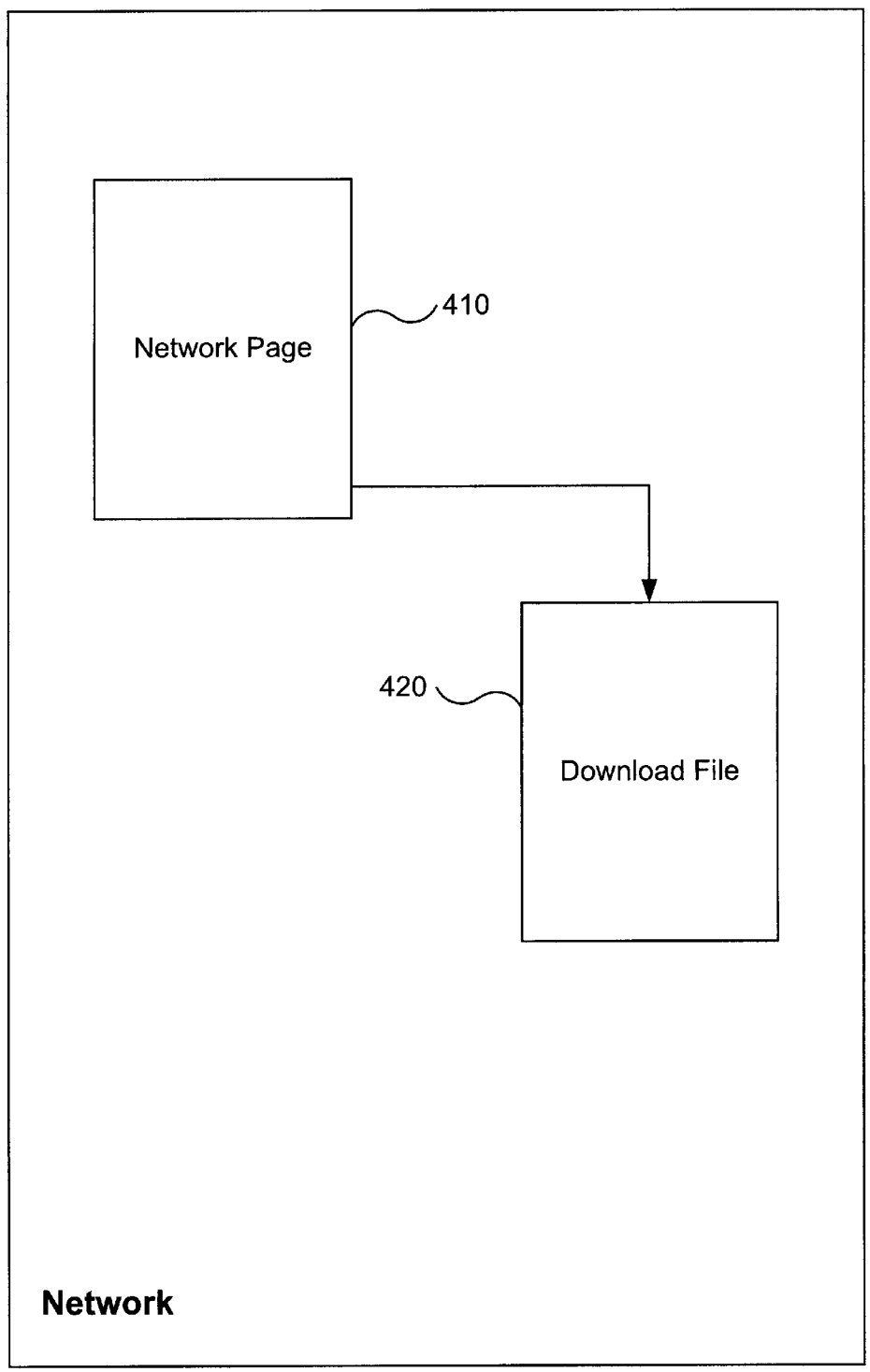
FIG. 6 is a block diagram for one embodiment of the network of FIG. 1, in accordance with the present invention.

Referring now to FIG. 6, a block diagram for one embodiment of the FIG. 1 network 100 is shown, in accordance with the present invention. In the FIG. 6 embodiment, network 100 includes, but is not limited to, a network page 410 and a download file 420. In the FIG. 6 embodiment, network page 410 and download file 420 preferably are located on one or more network servers (not shown) within network 100.

In typical operation of the FIG. 6 embodiment, a system user of client 120 (FIG. 1) accesses network page 410 by entering a corresponding network address or uniform resource locator (URL), and browser program 330 responsively connects client 120 to network page 410. Network page 410 preferably contains information relating to one or more update programs that may be appropriate for client 120. For example, network page 410 may contain the name and version number of one or more update programs that client 120 may wish to download and install.

Download module 430 then preferably compares the update module(s) listed on network page 410 and the software residing on client 120. If the version of the update program(s) listed on network page 410 does not match the corresponding programs currently residing on client 120, then download module 430 accesses the download file 420 via network page 410, and transfers the download file 420 via communication line 130 (FIG. 1) to client 120. Install module 432 then responsively installs and configures the update program from download file 420 onto client 120 to thereby complete the automatic software update procedure, in accordance with the present invention. In cases where a software conflict may result from the foregoing automatic software installation procedure, install module 432 may advantageously create a substitute registry for containing relevant information pertaining to the update program, and thereby avoid the software conflict.

Figure 7:
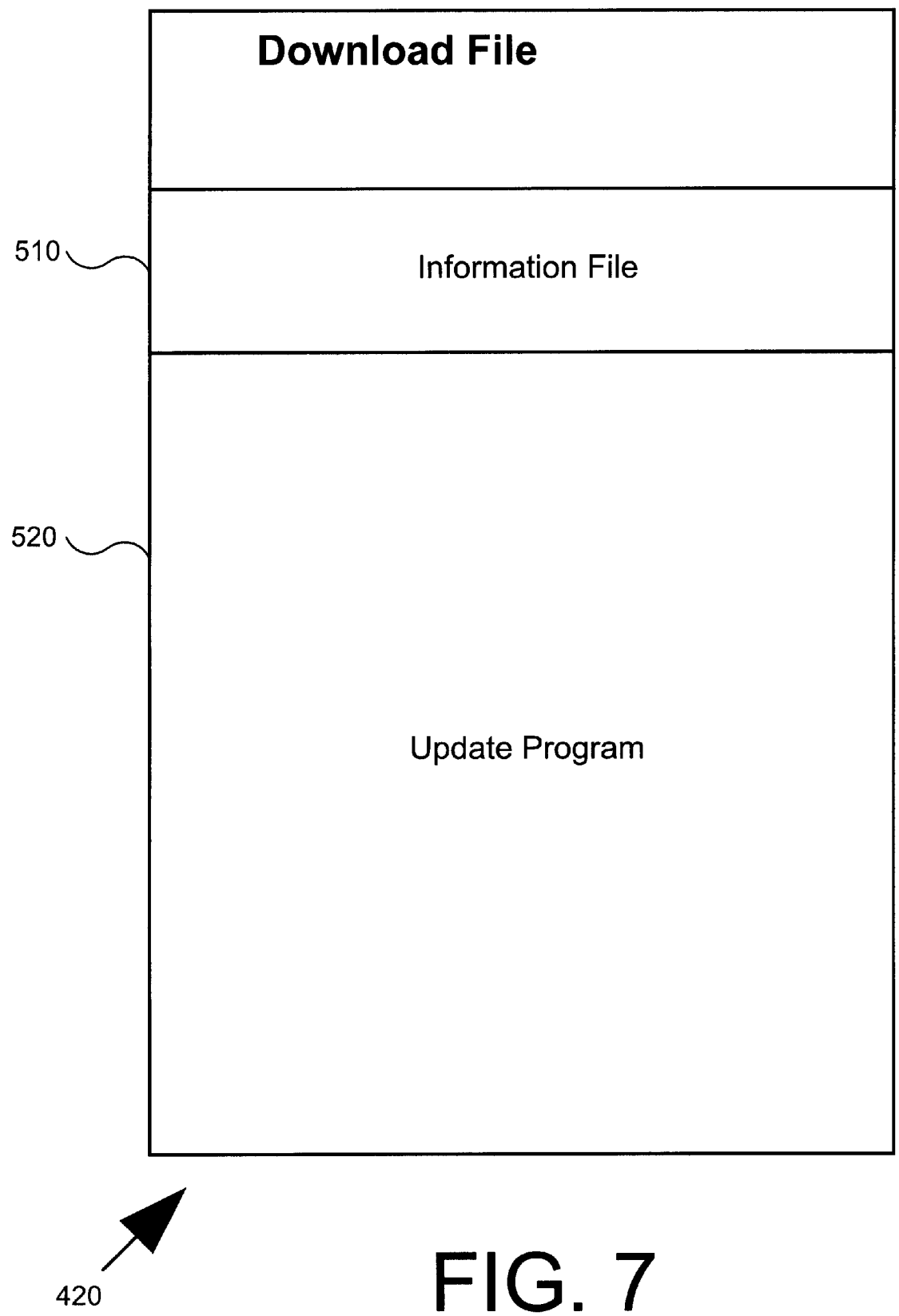
FIG. 7 is a diagram for one embodiment of the download file of FIG. 5, in accordance with the present invention.

Referring now to FIG. 7, a diagram for one embodiment of the FIG. 6 download file 420 is shown, in accordance with the present invention. In the FIG. 7 embodiment, download file 420 includes, but is not limited to, an information file 510, and one or more update programs 520. Information file 510 preferably contains selected information that relates to client-server system 160. For example, information file 510 may contain information related to the configuration and functionality of either client 120 or update program 520. Information file 510 also preferably includes registry information to allow install module 432 to create a substitute registry to advantageously avoid a software conflict, in accordance with the present invention. For example, information file 510 may include the name of the substitute registry, so that install module 432 may create the substitute registry to contain relevant information pertaining to a conflicting version of middleware or other software programs.

Update program 520 preferably includes software instructions that, when installed on client 120, are executable by CPU 210. Update program 520 typically includes software instructions that are of a different version or revision level than those software programs that currently reside on client 120. For example, update program 520 may be installed by install module 432 onto client 120 to advantageously update middleware 320, middleware 325, or client application 310 in non-volatile memory 240. Alternately, update program 520 may contain replacement program instructions to update any other software program in client-server system 160.

Referring now to FIG. 8(*a*), a diagram for one embodiment of the FIG. 3 client registries 355 is shown, in accordance with the present invention. The FIG. 8(*a*) embodiment is presented as an example to illustrate one possible structure for client registries 355, as they exist before client 120 installs middleware 325. However, in other embodiments, client registries 355 may readily be implemented to include any other appropriate and compatible registry structure.

In the FIG. 8(*a*) embodiment, client registries 355 preferably comprise client software 812 which further includes a client application registry 310(*a*), a browser program registry 330(*a*), and a middleware registry 320(*a*). In FIG. 8(*a*), middleware registry 320(*a*) is open to reveal contents that include a database client component 516(*a*), a connectivity driver component 514(*a*), and a connectivity manager component 512(*a*). For the purpose of illustration, the foregoing middleware registry 320(*a*) of FIG. 8(*a*) is intended to correspond to middleware 320 of FIG. 5.

Figure 8A:
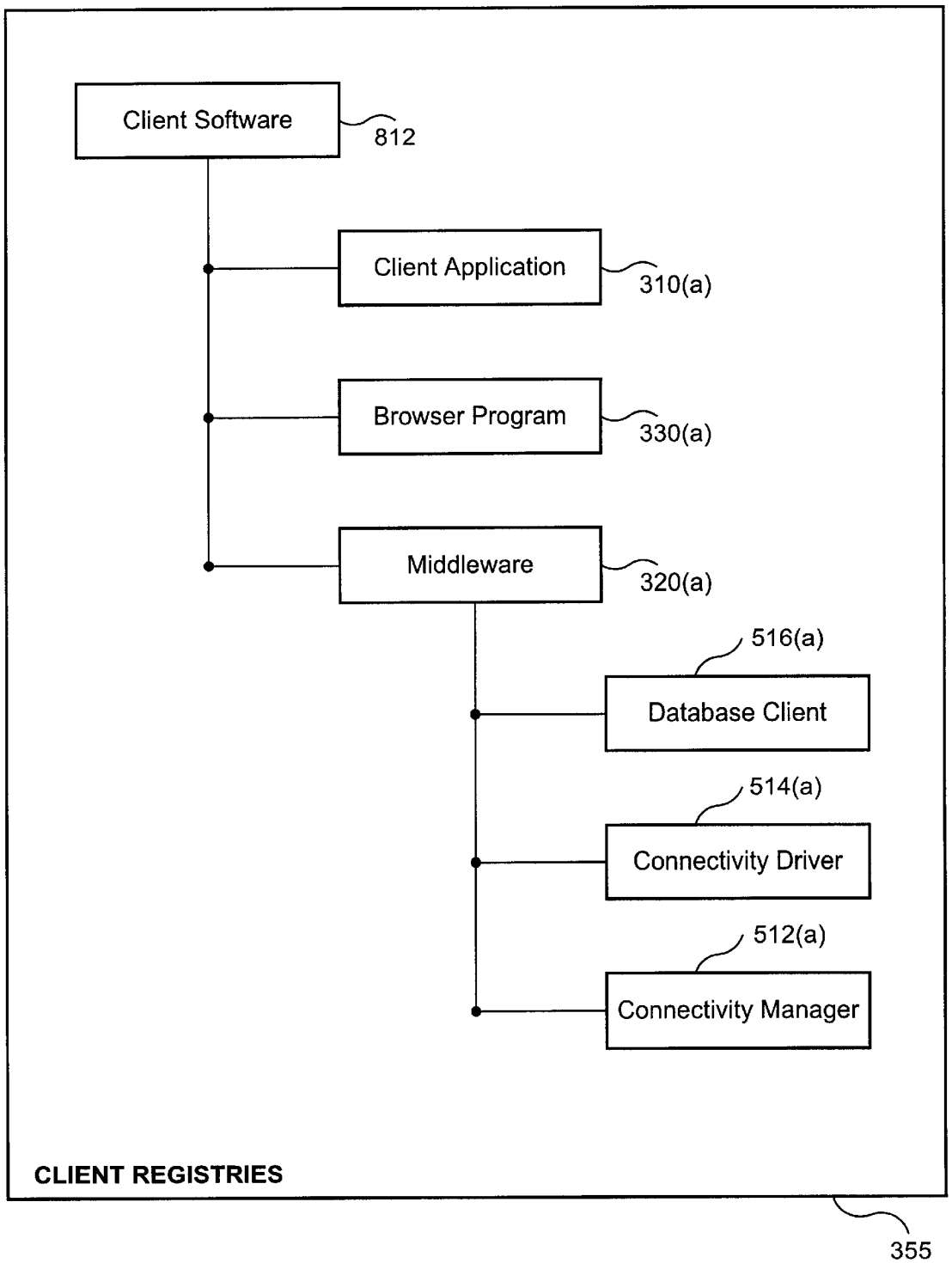
FIG. 8(a) is a diagram for one embodiment of the client registries of FIG. 3, in accordance with the present invention.
Figure 8B:
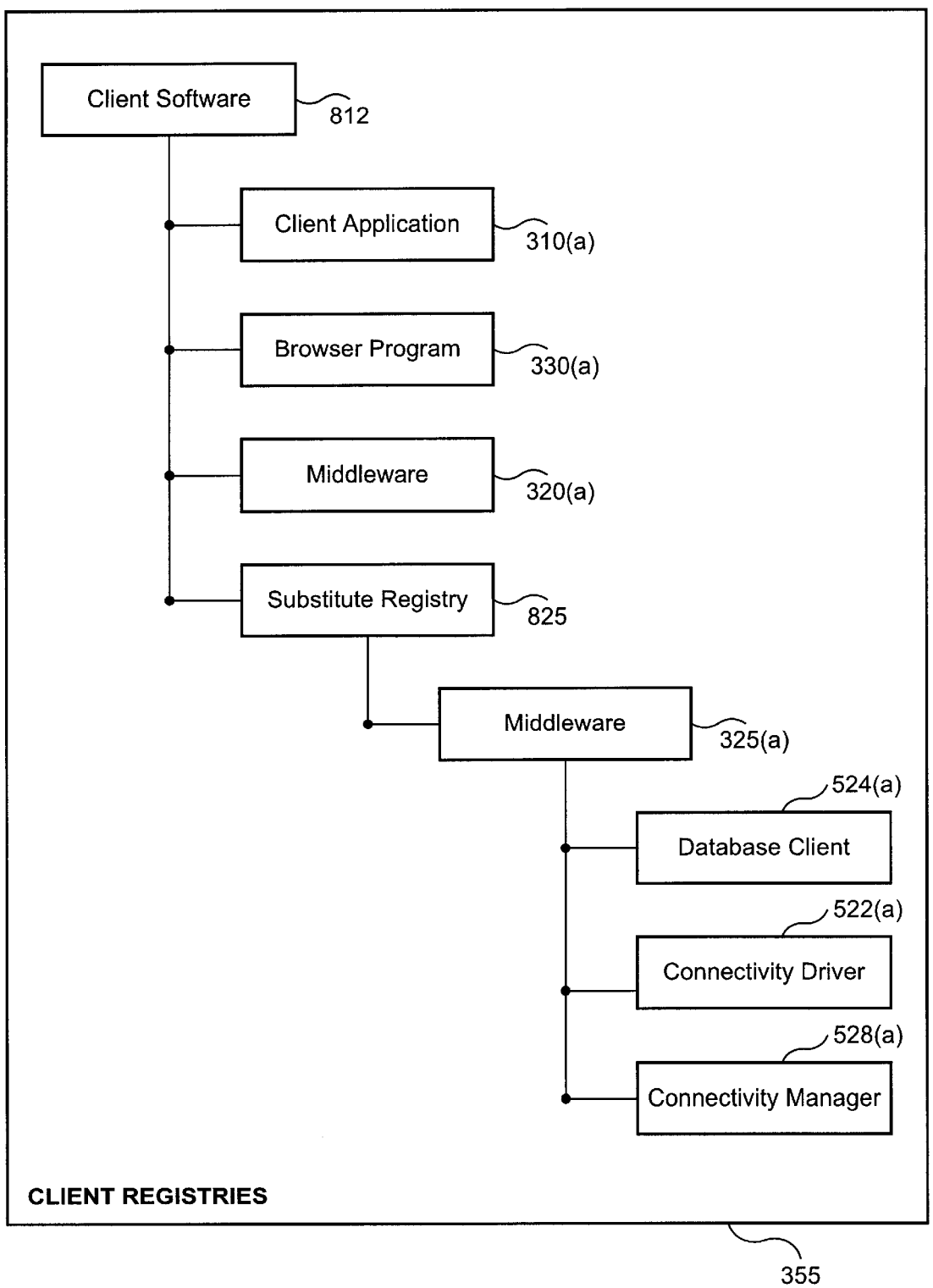
FIG. 8(b) is a diagram for one embodiment of the client registries of FIG. 3, in accordance with the present invention.

Referring now to FIG. 8(b), a diagram for one embodiment of the FIG. 3 client registries 355 is shown, in accordance with the present invention. The FIG. 8(b) embodiment is presented as an example to illustrate one possible structure for client registries 355, as they exist after client 120 adds middleware 325 into the FIG. 8(a) embodiment. However, in other embodiments, client registries 355 may readily be implemented to include any other appropriate and compatible registry structure. In the FIG. 8(b) embodiment, client registries 355 preferably comprises client software 812 which further includes a client application registry 310(a), a browser program registry 330(a), and a middleware registry 320(a) that, unlike the FIG. 8(a) embodiment, is now closed.

Further, during an installation procedure in which middleware 325 exists in download file 420 as update program 520, install module 432 then advantageously creates substitute registry 825 based on information obtained from information file 510 of download file 420. Substitute registry 825 may be named any unique and appropriate registry name that avoids a software conflict with other software programs in client registries 355, as discussed above in conjunction with FIGS. 5 and 7.

Update module 432 then preferably adds update program 520 (here, middleware 325) as a sub-registry (here, middleware registry 325(a)) of substitute registry 825, as shown in FIG. 8(b), to advantageously prevent software conflict between middleware registry 320(a) (since both middleware 320 and middleware 325 may possess the same program name). In the foregoing manner, adding middleware registry 325(a) as a sub-registry of substitute registry 825 does not overwrite previously-added middleware registry 320(a). In some embodiments, update module 432 checks for a software conflict, and then creates substitute registry 825 only where a software conflict exists. In FIG. 8(b), middleware registry 325(a) is open to reveal contents that include a database client component 524(a), a connectivity driver component 522(a), and a connectivity manager component 528(a). For the purpose of illustration, the foregoing middleware registry 325(a) of FIG. 8(b) is intended to correspond to middleware 325 of FIG. 5.

Figure 9:
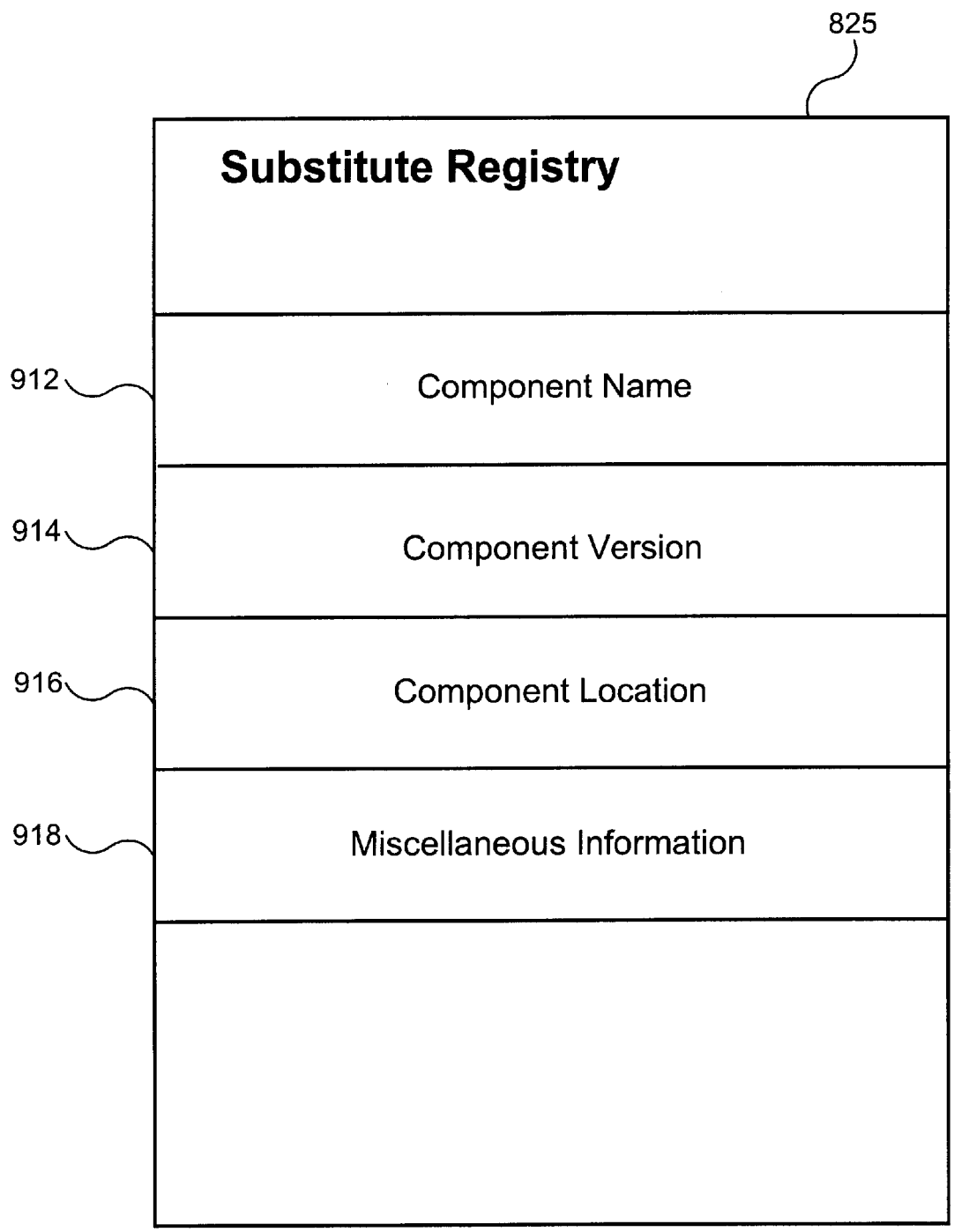
FIG. 9 is a diagram for one embodiment of the substitute registry of FIG. 8(b), in accordance with the present invention.

Referring now to FIG. 9, a diagram for one embodiment of the FIG. 8(b) substitute registry 825 is shown, in accordance with the present invention. In the FIG. 9 embodiment, substitute registry 825 may include, but is not limited to, a component name 912, a component version 914, a component location 916, and miscellaneous information 918. In accordance with the present invention, other registry listings in client registries 355 may include similar contents to those described and discussed in conjunction with the FIG. 9 embodiment of substitute registry 825. However, substitute registry 825 and other listing in client registries 355 need not each always include all the various types of information discussed in conjunction with the FIG. 9 embodiment.

Component name 912 preferably includes a standardized name corresponding to a particular component of the software program being represented. In the case of substitute registry 825, component name 912 may be any unique and appropriate name that avoids conflict with other entries in client registries 355. Component version 914 may include information regarding the version or revision level of the corresponding software program or component.

Component location 916 may include information regarding where the corresponding software program or component is located in the memory of client 120. Miscellaneous information 918 may include any other relevant and appropriate information regarding a corresponding software program or component, depending upon the particular registry listing in question. For example, miscellaneous information 918 may include, but is not limited to, a copyright notice, a license agreement, a description of the corresponding software, a user identification number, and a password.

Figure 10:
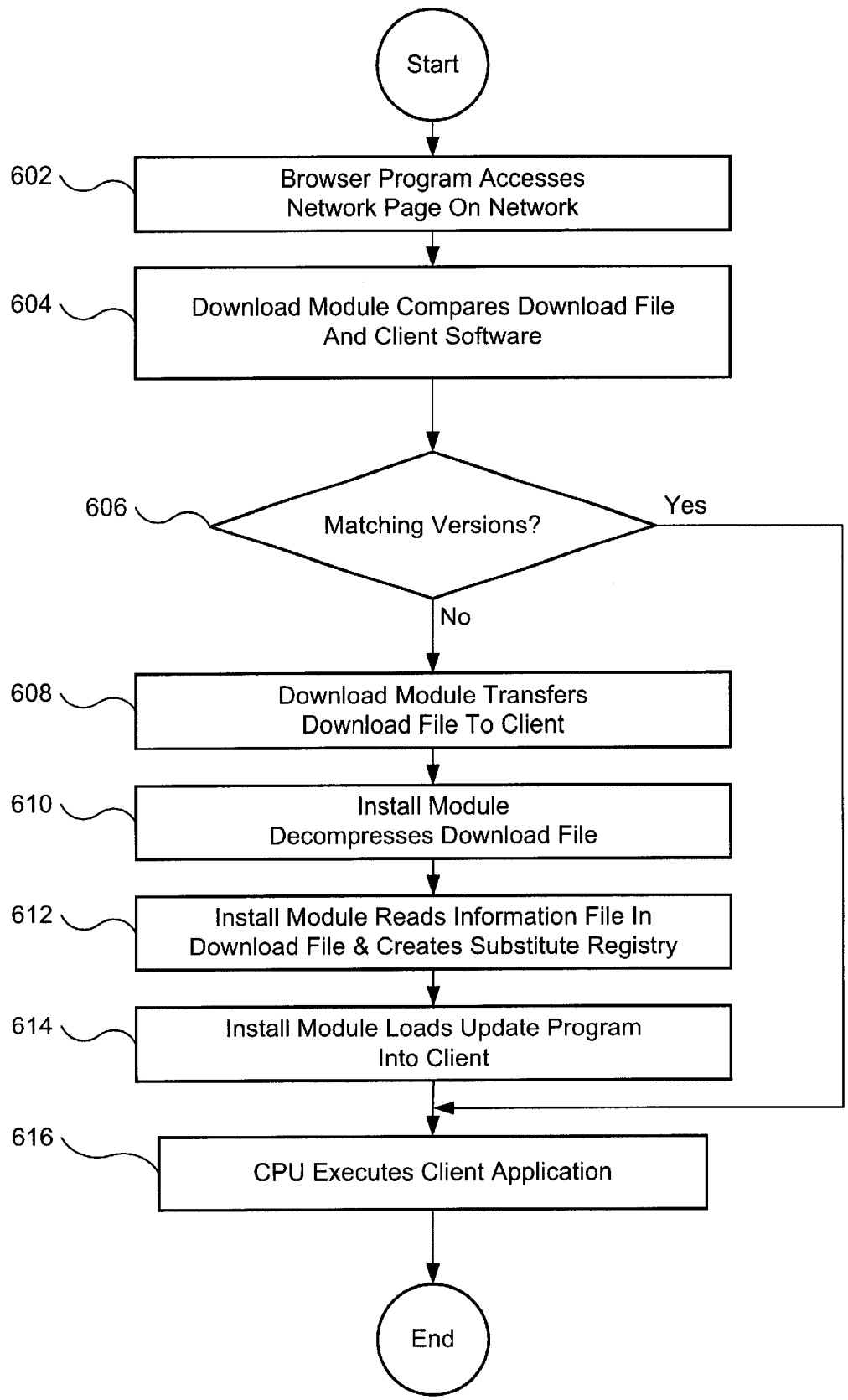
FIG. 10 is a diagram for one embodiment of method steps to automatically install software programs, in accordance with the present invention.

Referring now to FIG. 10, a flowchart for one embodiment of method steps to automatically install software programs is shown, in accordance with the present invention. In the FIG. 10 embodiment, initially, in step 602, network access module 434 from browser program 330 accesses a selected network page 410 on network 100. Network access module 434 may act in response to a network location address (or URL) provided to client 120 by a system user. Alternately, network access module 434 may automatically access network page 410 in response to various predetermined access criteria.

In step 604, download module 430 preferably performs a comparison procedure between one or more download files 420 listed on network page 410 and the software programs currently installed on client 120. For example, download module 430 may compare the name and version number of update program 520 in download file 420 and the name and version number of middleware 320 on client 120. Alternately, in cases where client 120 does not include a prior version of update program 520, download module 420 may read the name and version number of update program 520 in download file 420 and then find no matching software program on client 120.

In step 606, download module 420 determines whether matching versions of update program 520 currently exist in both download file 420 and on client 120. If matching versions of update program 520 currently exist in both download file 420 and on client 120, then no update procedure is required, and the FIG. 10 process advances to step 616. However, if matching versions of update program 520 do not currently exist in both download file 420 and on client 120, then, in step 608, download module 420 transfers download file 420 from network 100 to client 120 via communication line 130 (FIG. 1).

In step 610, if download file 420 is in a compressed format, then install module 432 decompresses download file 420. Next, in step 612, install module 432 reads information file 510 in download file 420, and responsively creates a substitute registry 825 that corresponds to update program 520, and thereby avoids a software conflict in client registries 355, in accordance with the present invention. In other embodiments of the present invention, install module 432 may similarly create substitute registry 825 at any other appropriate time during the FIG. 10 process.

Then, in step 614, install module 432 installs update program(s) 520 from download file 420 onto client 120. Finally, in step 616, CPU 210 is preferably notified by browser 330 that the FIG. 10 update procedure has been completed, and CPU 210 responsively executes client application 310 for use by a system user, in accordance with the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. For example, the software program used in the software installation procedure need not be downloaded from a distributed computer network, and may readily be provided from any other appropriate and compatible source. Therefore, these and other variations upon the preferred embodiments are intended to be covered by the present invention, which is limited only by the appended claims.

What is claimed is:

1. A system for automatically installing a software program on a computer system, comprising:
   an install module configured to automatically create a substitute registry corresponding to said software program to avoid a software conflict between said software program and an existing program on said computer system; and
   a processor coupled to said computer system to control said install module to thereby automatically install said program.

2. The system of claim 1 wherein said computer system functions as a client of a central server configured to receive information from said client and provide information to said client, said computer system and said central server thereby forming a client-server system.

3. The system of claim 2 wherein said client-server system further includes a plurality of client systems each communicating with said central server.

4. The system of claim 2 wherein said central server includes one or more databases of information for use by said client.

5. The system of claim 1 further comprising a distributed network including network pages that are accessible by a browser program.

6. The system of claim 5 wherein said distributed network includes an Internet system containing said network pages that are accessible by said browser program.

7. The system of claim 2 wherein said software program includes at least one of a client application that performs a client function and middleware that allows said client application to communicate with said central server.

8. The system of claim 5 wherein said browser includes a download module for transferring an update program from said distributed network to said computer system.

9. The system of claim 8 wherein said install module installs said update program from said distributed network onto said computer system.

10. The system of claim 8 wherein said browser program accesses a selected network page on said distributed network using a network access module.

11. The system of claim 10 wherein said selected network page is linked to a download file that includes said update program and an information file containing updated configuration information corresponding to said update program, said updated configuration information including registry information for creating a substitute registry corresponding to said update program.

12. The system of claim 1 wherein said software conflict results when said software program and said existing program have similar program names, and said software program overwrites said existing program in client registries that hierarchically identify software on said computer system.

13. The system of claim 12 wherein said substitute registry has a unique name within said client registries of said computer system.

14. The system of claim 13 wherein said client registries are displayed on a graphical user interface coupled to said computer system to permit a system user to access and manipulate said client registries.

15. The system of claim 1 wherein said install module obtains said software program and substitute registry information directly from a non-volatile memory device within said computer system.

16. The system of claim 1 wherein said install module uses said software program to update said existing program on said computer system.

17. The system of claim 16 wherein said processor executes a client application after said install module notifies said processor that said existing program is updated.

18. A system for automatically installing a software program on a computer system, comprising:
   an install module configured to automatically create a substitute registry for installing said software program; and
   a processor coupled to said computer system to control said install module to thereby automatically install said software program, wherein installing said software program creates a software conflict between said software program and an existing program on said computer system, said software conflict resulting when said software program and said existing program have similar program names, and said software program overwrites said existing program in client registries that hierarchically identify software on said computer system, said install module creating a substitute registry in which said software program is installed to avoid said software conflict with said existing program, said substitute registry having a unique name within said client registries of said computer system, said client registries being displayed on a graphical user interface coupled to said computer system to permit a system user to access and manipulate said client registries, said existing program being a first set of middleware, and said software program being a second set of middleware, said first set of middleware and said second set of middleware each including a database client, a connectivity driver, and a connectivity manager, said first set of middleware and said second set of middleware each having different version levels.

19. A method for automatically installing a software program on a computer system, comprising the steps of:
   creating a substitute registry that corresponds to said software program by using an install module to avoid a software conflict between said software program and an existing program on said computer system; and
   controlling said install module with a processor to thereby automatically install said software program.

20. The method of claim 19 wherein said computer system functions as a client of a central server configured to receive information from said client and provide information to said client, said computer system and said central server thereby forming a client-server system.

21. The method of claim 20 wherein said client-server system further includes a plurality of client systems each communicating with said central server.

22. The method of claim 20 wherein said central server includes one or more databases of information for use by said client.

23. The method of claim 20 wherein said software program includes at least one of a client application that performs a client function and middleware that allows said client application to communicate with said central server.

24. The method of claim 19 further comprising a distributed network including network pages that are accessible by a browser program.

25. The method of claim 24 wherein said distributed network includes an Internet system containing said network pages that are accessible by said browser program.

26. The method of claim 24 wherein said browser includes a download module for transferring an update program from said distributed network to said computer system.

27. The method of claim 26 wherein said install module installs said update program from said distributed network onto said computer system.

28. The method of claim 26 wherein said browser program accesses a selected network page on said distributed network using a network access module.

29. The method of claim 28 wherein said selected network page is linked to a download file that includes said update program and an information file containing updated configuration information corresponding to said update program, said updated configuration information including registry information for creating a substitute registry corresponding to said update program.

30. The method of claim 19 wherein said software conflict results when said software program and said existing program have similar program names, and said software program overwrites said existing program in client registries that hierarchically identify software on said computer system.

31. The method of claim 30 wherein said substitute registry has a unique name within said client registries of said computer system.

32. The method of claim 31 wherein said client registries are displayed on a graphical user interface coupled to said computer system to permit a system user to access and manipulate said client registries.

33. The method of claim 19 wherein said install module obtains said software program and substitute registry information directly from a non-volatile memory device within said computer system.

34. The method of claim 19 wherein said install module uses said software program to update said existing program on said computer system.

35. The method of claim 34 wherein said processor executes a client application after said install module notifies said processor that said existing program is updated.

36. A method for automatically installing a software program on a computer system, comprising the steps of:

creating a substitute registry that corresponds to said software program by using an install module; and controlling said install module with a processor to thereby automatically install said software program; wherein installing said software program creates a software conflict between said software program and an existing program on said computer system, said software conflict resulting when said software program and said existing program have similar program names, and said software program overwrites said existing program in client registries that hierarchically identify software on said computer system, said install module creating a substitute registry in which said software program is installed to avoid said software conflict with said existing program, said substitute registry having a unique name within said client registries of said computer system, said client registries being displayed on a graphical user interface coupled to said computer system to permit a system user to access and manipulate said client registries, said existing program being a first set of middleware, and said software program being a second set of middleware, said first set of middleware and said second set of middleware each including a database client, a connectivity driver, and a connectivity manager, said first set of middleware and said second set of middleware each having different version levels.

37. A system for automatically installing a software program on a computer system, comprising:

means for creating a substitute registry that corresponds to said software program to avoid a software conflict between said software program and an existing program on said computer; and means for controlling said means for creating to thereby automatically install said software program.

38. A computer-readable medium comprising program instructions for installing a software program by performing the steps of:

creating a substitute registry that corresponds to said software program by using an install module to avoid a software conflict between said software program and an existing program on said computer system; and controlling said install module with a processor to thereby automatically install said software program.

* * * * *